United States Patent

Kawai

[11] Patent Number: 6,154,613
[45] Date of Patent: *Nov. 28, 2000

[54] DIAPHRAGM DEVICE HAVING FULL-OPEN APERTURE DIAMETER ELECTRICALLY VARIED ACCORDING TO ZOOMING

[75] Inventor: Tohru Kawai, Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/234,582

[22] Filed: Apr. 28, 1994

Related U.S. Application Data

[63] Continuation of application No. 07/934,711, Aug. 24, 1992, abandoned.

[30] Foreign Application Priority Data

Aug. 29, 1991 [JP] Japan ..................................... 3-218659

[51] Int. Cl.[7] ........................................................ G03B 7/00
[52] U.S. Cl. .............................................. 396/64; 348/363
[58] Field of Search ............................. 354/271.1, 195.1, 354/195.11, 195.12; 396/63, 64, 85, 79, 80, 81; 348/347, 358, 362, 363

[56] References Cited

U.S. PATENT DOCUMENTS

| | | | |
|---|---|---|---|
| 4,159,864 | 7/1979 | Yasukuni et al. | 359/691 |
| 4,636,041 | 1/1987 | Kotaka et al. | 359/694 |
| 4,841,327 | 6/1989 | Yamamoto et al. | 354/271.1 X |
| 4,896,177 | 1/1990 | Kazami et al. | 396/85 |
| 5,073,790 | 12/1991 | Ogawa | 354/271.1 X |
| 5,122,822 | 6/1992 | Morisawa et al. | 396/63 |
| 5,146,259 | 9/1992 | Kobayashi et al. | 354/195.1 X |
| 5,278,605 | 1/1994 | Satoh | 396/63 |

*Primary Examiner*—David M. Gray
*Attorney, Agent, or Firm*—Robin, Blecker & Daley

[57] ABSTRACT

An optical apparatus having a diaphragm device required to have the full-open aperture thereof varied according to zooming includes a zoom detection part for detecting the state of zooming, the diaphragm device including a motor serving as a drive source to drive a diaphragm member for varying the aperture diameter thereof, and a control circuit arranged to vary the full-open aperture diameter by driving the motor of the diaphragm device on the basis of detection information provided by the zoom detection part.

4 Claims, 4 Drawing Sheets

FIG.2(a) STEPS  −5 −4 −3 −2 −1 0 1 2 3 4 5 6 7 8 9 10 11 12 13 14 15 16 17 18 19 20 21 22

FIG.2(h) STOPPER

FIG. 3

| ZOOM POSITION | 0 | 1 | 2 | 3 | 4 | 5 | 6 | 7 | 8 | 9 |
|---|---|---|---|---|---|---|---|---|---|---|
| (a) | 0 | 1 | 2 | 3 | 4 | 5 | 6 | 7 | 8 | 9 |
| (b) | H | H | L | L | L | L | L | H | H | H |
| (c) | L | H | H | H | L | L | L | L | L | H |
| (d) | L | L | L | H | H | H | L | L | L | L |
| (e) | L | L | L | L | L | H | H | H | L | L |
| (f) | H | H | H | H | — | — | L | L | L | L |
| (g) | H | H | H | H | H | H | H | H | H | H |
| (h) | L | L | L | L | L | L | L | L | L | L |

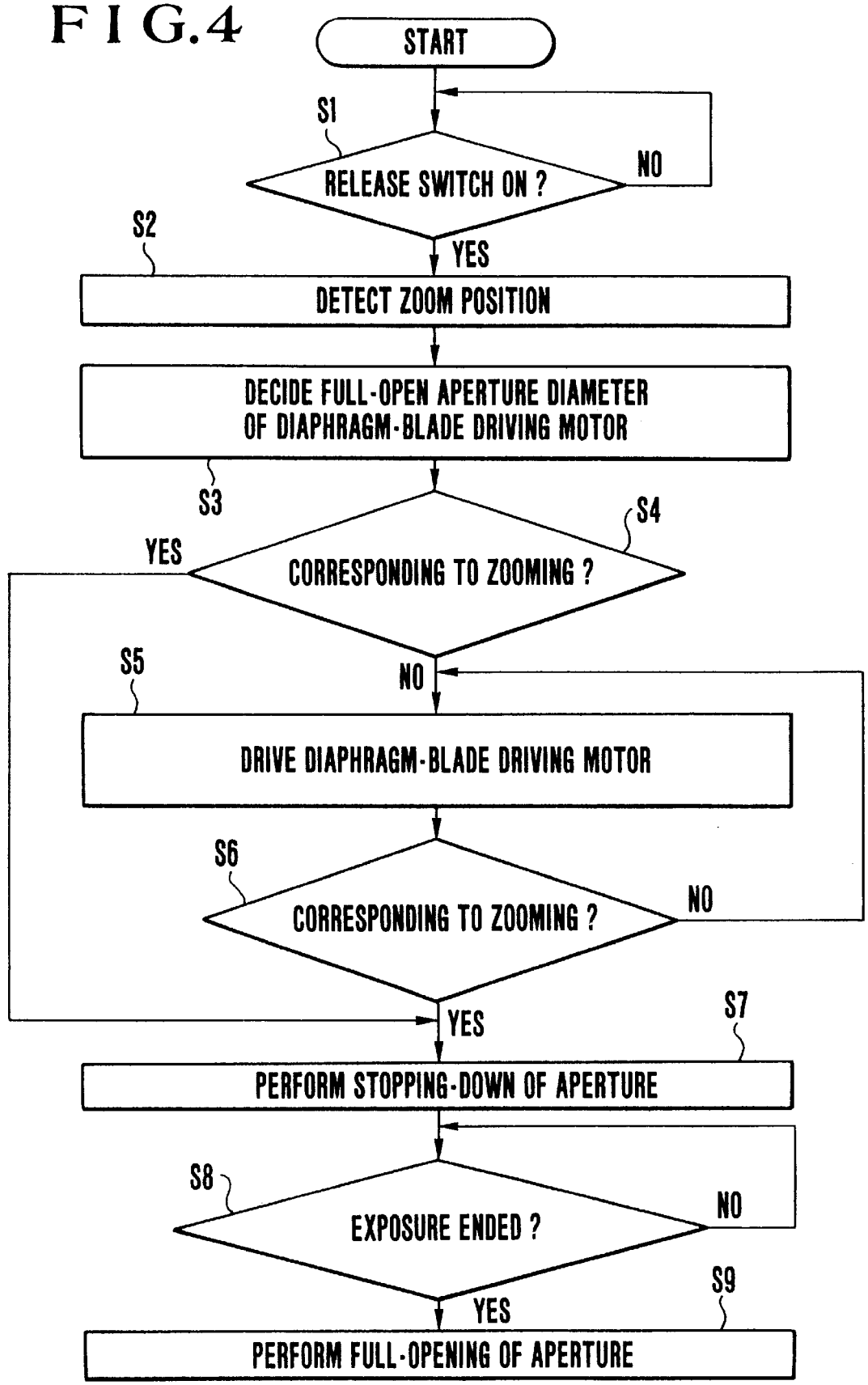

DIAPHRAGM DEVICE HAVING FULL-OPEN APERTURE DIAMETER ELECTRICALLY VARIED ACCORDING TO ZOOMING

This is a continuation application under 37 CFR 1.62 of prior application Ser. No. 07/934,711, filed Aug. 24, 1992, now abandoned.

BACKGROUND OF THE INVENTION

1. Field of the Invention

This invention relates to an optical apparatus having a diaphragm device which is arranged to vary the full-open aperture diameter thereof according to zooming.

2. Description of the Related Art

The aperture of a diaphragm device disposed at the interchangeable lens of a single-lens reflex camera is arranged to be always kept in a full-open state to permit light measurement with the aperture fully opened and to be stopped down immediately before a shutter release. The camera system of this kind is provided with a switch for detecting the full-open state of the diaphragm device as in the case of, for example, a camera system disclosed in U.S. Pat. No. 4,841,327. In order to vary the full-open aperture diameter according to a zooming operation on the lens in the camera system of this kind, it has been practiced to use a cam mechanism for interlocking the diaphragm device with a zoom mechanism with the full-open state detecting switch set in a fixed position.

In the conventional camera system described above, the mechanism for mechanically varying the full-open aperture diameter according to zooming is provided in the lens barrel of the camera system. Therefore, the lens barrel has necessitated a complex structural arrangement, which has increased the cost of the camera system.

SUMMARY OF THE INVENTION

One aspect of this invention resides in the provision of an optical apparatus having a diaphragm device, wherein the full-open aperture diameter of the diaphragm device is arranged to be varied by applying a current to a diaphragm-blade driving motor according to the state of zooming, so that the necessity of using a mechanism such as a cam mechanism or the like can be obviated.

The above and other aspects and features of this invention will become apparent from the following detailed description of an embodiment thereof taken in connection with the accompanying drawings.

BRIEF DESCRIPTION OF THE DRAWINGS

FIGS. 2(a) to 2(h) show in a timing chart the waveforms of energization to a diaphragm-blade driving stepping motor shown in FIG. 1 and the operation timing of a full-open position detecting switch and a mechanical stopper.

FIG. 3 shows the states of the motor, the switches and the mechanical stopper corresponding to the various zoom positions obtained with the aperture of the diaphragm device in a full-open state.

FIG. 4 is a flow chart showing the operation of a control circuit of the same embodiment.

DETAILED DESCRIPTION OF THE PREFERRED EMBODIMENT

Figure 1:
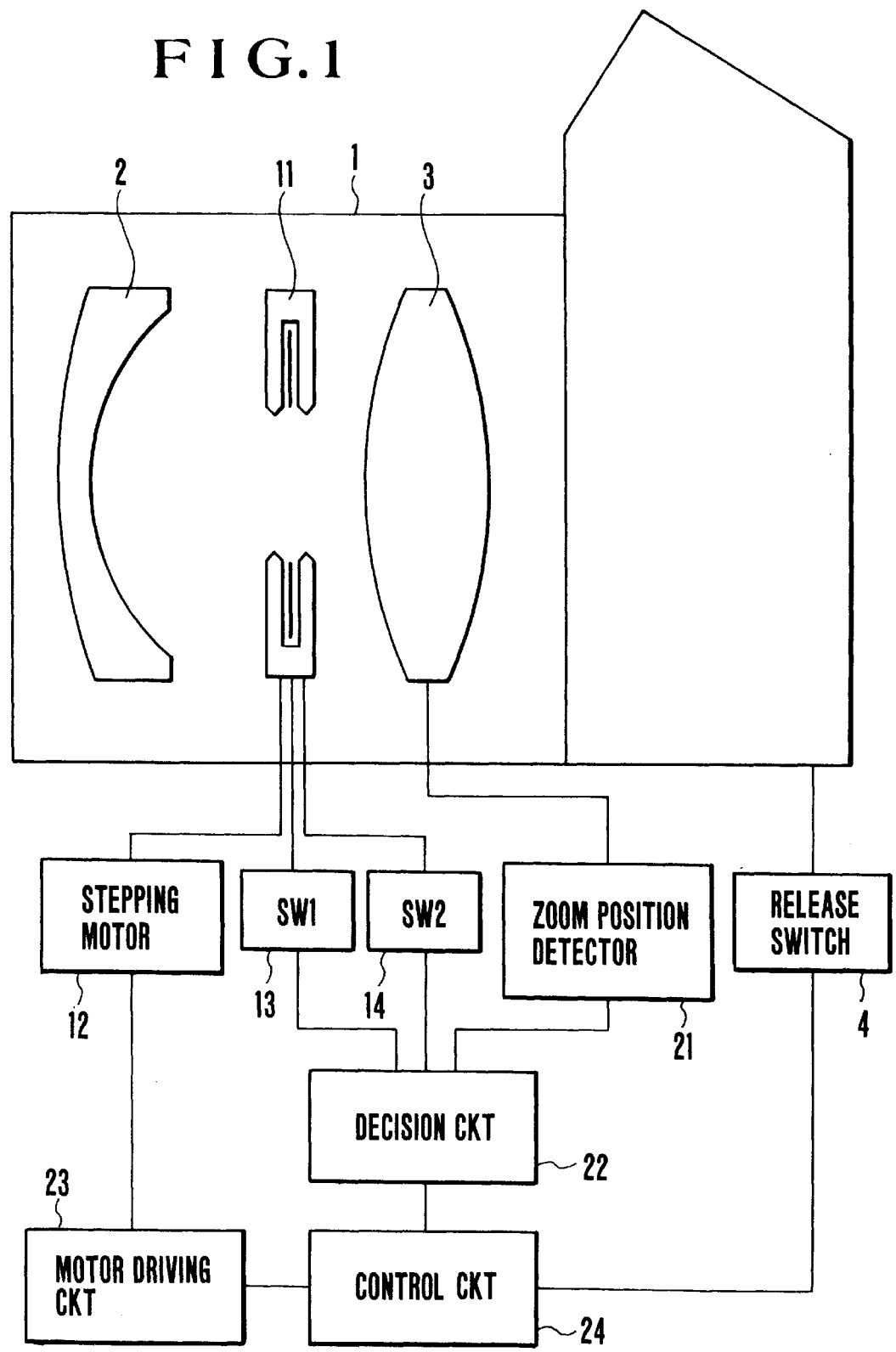
FIG. 1 is a block diagram showing in outline the arrangement of a camera and a zoom lens having a diaphragm device arranged as an embodiment of this invention.

An embodiment of this invention is described below with reference to the accompanying drawings:

FIG. 1 shows in outline the arrangement of a camera having a diaphragm device arranged as an embodiment of this invention. Referring to FIG. 1, a zoom lens barrel 1 is arranged to perform zooming with optical systems 2 and 3 moved in the direction of an optical axis by means of a mechanism which is not shown. A release switch 4 is arranged to detect an operation performed on the shutter release button of the camera. Reference numeral 11 denotes the diaphragm device. A stepping motor 12 is arranged to drive the blades of the diaphragm device 11. Full-open position detecting switches 13 (SW1) and 14 (SW2) are arranged to operate at different aperture positions. The camera is provided with a zoom position detector 21; a decision circuit 22; a motor driving circuit 23; and a control circuit 24 which is a CPU or the like.

FIGS. 2(a) to 2(h) show in a timing chart the signals and actions of the various parts included in the arrangement shown in FIG. 1. FIG. 2(a) shows the step positions of the stepping motor 12. These step positions correspond to the aperture varying steps of the diaphragm device 11. FIGS. 2(b) to 2(e) show the waveforms of bipolar energization to the stepping motor 12 of the two-phase coil type. FIGS. 2(f) and 2(g) show the operating timing of the switches SW1 and SW2 for detecting the full-open states of the diaphragm device 11. In FIGS. 2(f) and 2(g), broken-line parts represent the deviations of timing position.

FIG. 2(h) shows the timing of the position of a mechanical stopper located on the extension of the full-open aperture position of the diaphragm device 11. In FIG. 2(h), a deviation from the timing position is indicated by a broken line.

FIG. 3 show the states of the motor, the switches and the mechanical stopper corresponding to the various zoom positions obtained with the diaphragm device 11 in its full-open state. The parts (a) to (h) of FIG. 3 correspond respectively to FIGS. 2(a) to 2(h).

Next, the photographing operation of the embodiment is described below with reference to FIG. 4 which is a flow chart.

At a step S1 of the flow of operation, the release switch 4 is caused to operate by an operation on the shutter release button. At a step S2: The control circuit 24 detects, through the zoom position detector 21, the current zooming state, i.e., the current focal length. At a step S3: The full-open aperture diameter of the diaphragm device 11 is decided on the basis of the focal length as detected. In the case of this embodiment, the full-open aperture diameter is decided at the step S3 to be one of ten different aperture diameters according to the current zooming state, as shown in FIG. 3. At a step S4: A check is made to find if the current aperture position of the diaphragm device 11 is at the full-open aperture diameter decided at the step S3 according to the focal length. If so, the flow comes to a step S7. If not, the flow proceeds to a step S5. At the step S5: The stepping motor 12 is driven to drive the blades of the diaphragm device 11 so as to change the aperture position thereof to the decided full-open aperture diameter by detecting the states of the full-open position detecting switches SW1 and SW2 and, then, energizing the stepping motor 12 in a combination of waveforms (b) to (e) corresponding to the zooming state, as shown in FIG. 3. At a step S6: A check is made to find if the aperture corresponds to the zooming. The steps S5 and S6 are repeated until the decided full-open aperture diameter is attained.

At the step S7: Upon receipt of a signal for commencement of an exposure, the diaphragm-blade driving stepping motor 12 is driven to drive the diaphragm blades in the direction of stopping down the aperture. In this instance, the number of stopping-down steps is decided by an exposure computing circuit which is not shown. At a step S8: Upon receipt of a signal indicative of the end of the exposure, the flow proceeds to a step S9. At the step S9: The stepping motor 12 is driven in the direction of opening the diaphragm aperture to bring the diaphragm device 11 back to the full-open aperture diameter decided at the step S3.

In a case where zooming of the lens is performed with the shutter release button cancelled from the pushing operation, the full-open aperture diameter of the diaphragm device 11 is kept in a position obtained immediately before the cancellation of the pushing operation on the shutter release button. However, the instant the shutter release button is operated, the full-open aperture diameter of the diaphragm device 11 comes into a set state. Further, the full-open aperture diameter comes into the set state also after the stepping motor 12 is energized to a stopping-down position under this condition. This action is performed also by repeating the above-stated steps and is, therefore, omitted from description.

With respect to the aperture diameter which varies according to the zoom position, the number of full-open aperture positions variable according to the zoom position can be increased by increasing the number of full-open position detecting switches, if the operating timing of these switches is assumed to be not fluctuating.

In accordance with the conventional cam-driven zoom-interlocked mechanism, the full-open aperture diameter (F-number) of the diaphragm has inconstantly varied in the zooming direction due to the play, etc., of the mechanism. The conventional device thus has been unsatisfactory in terms of precision. Whereas, this embodiment as described in the foregoing is arranged to be capable of accurately varying the full-open aperture diameter (F-number) by energizing the stepping motor. Further, since the full-open aperture diameter is arranged to be determined by energizing the stepping motor, the precision of the aperture is never affected by assembly work on the device. Besides, a certain amount of error due to a positional deviation of the full-open position detecting switches or the mechanical stopper is allowable for assembly work. The invented arrangement thus facilitates the assembly work. Therefore, the embodiment can be manufactured at a lower cost than the conventional products.

What is claimed is:

1. An optical apparatus having a diaphragm device including a diaphragm member which varies an aperture diameter for light measurement operation according to a focal length, comprising:

a) zoom detection means for detecting a state of zooming and outputting information related to a present focal length of said optical apparatus;

b) said diaphragm device including a stepping motor serving as a drive source to move said diaphragm member for varying the aperture diameter thereof; and an aperture diameter control circuit which determines an aperture diameter for said light measurement operation according to said information outputted from said zoom detection means and supplies an energization pattern corresponding to the determined aperture diameter to said stepping motor, said energization pattern being selected among plural energization patterns which differ by every aperture diameter, and said aperture diameter control circuit causes said diaphragm member to move so as to define said determined aperture diameter.

2. An apparatus according to claim 1, wherein said control circuit is arranged to utilize an output information of a switch means for detecting different aperture diameters.

3. An apparatus according to claim 2, wherein said control circuit is arranged to cause the aperture diameter of said diaphragm member to change to a determined aperture diameter by utilizing the output information of said switch means and a variation of energization to said stepping motor.

4. An apparatus according to claim 1, wherein said control circuit is arranged to start to vary the aperture diameter in response to an operation on a release button.

* * * * *

UNITED STATES PATENT AND TRADEMARK OFFICE
CERTIFICATE OF CORRECTION

PATENT NO. : 6,154,613                                                Page 1 of 1
DATED : November 28, 2000
INVENTOR(S) : Tohru Kawai It is certified that error appears in the above-identified patent and that said Letters Patent is hereby corrected as shown below:

<u>Column 4,</u>
Line 20, before "an aperture" insert -- c) --.

Signed and Sealed this

First Day of January, 2002

Attest:

Attesting Officer

JAMES E. ROGAN
Director of the United States Patent and Trademark Office